United States Patent [19]

Baus

[11] Patent Number: 4,750,151

[45] Date of Patent: Jun. 7, 1988

[54] APPARATUS FOR SELECTIVELY RETRIEVING STORED INFORMATION TO A PLURALITY OF OUTPUT UNITS IN RESPONSE TO TOUCHING DISPLAY PANEL AREAS ASSOCIATED WITH THE INFORMATION TO BE RETRIEVED

[76] Inventor: Heinz G. Baus, Hünibach-Thun, Switzerland

[21] Appl. No.: 781,525

[22] Filed: Sep. 30, 1985

[30] Foreign Application Priority Data

Oct. 4, 1984 [DE] Fed. Rep. of Germany ....... 3436390

[51] Int. Cl.⁴ ............................ G06F 3/02; G06F 3/14; G06F 15/21
[52] U.S. Cl. ..................................... 364/900; 364/400
[58] Field of Search ... 364/200 MS File, 900 MS File; 364/400, 401; 340/365 A, 365 C

[56] References Cited

U.S. PATENT DOCUMENTS

| | | | |
|---|---|---|---|
| 4,233,522 | 11/1980 | Grummer et al. | 340/365 C X |
| 4,296,406 | 10/1981 | Pearson | 340/365 A X |
| 4,305,071 | 12/1981 | Bell et al. | 364/571 X |
| 4,363,029 | 12/1982 | Piliavin et al. | 340/712 X |
| 4,386,232 | 5/1983 | Slater | 340/712 X |
| 4,415,065 | 11/1983 | Sandstedt | 364/401 X |
| 4,449,186 | 5/1984 | Kelly et al. | 364/900 X |
| 4,547,851 | 10/1985 | Kurland | 364/900 X |
| 4,567,359 | 1/1986 | Lockwood | 235/381 |

FOREIGN PATENT DOCUMENTS

| | | |
|---|---|---|
| 99072 | 1/1984 | European Pat. Off. . |
| 3030923 | 5/1982 | Fed. Rep. of Germany . |
| 2080990 | 2/1982 | United Kingdom . |

Primary Examiner—Thomas M. Heckler
Attorney, Agent, or Firm—Foley & Lardner, Schwartz Jeffery, Schwaab, Mack, Blumenthal & Evans

[57] ABSTRACT

An apparatus for use particularly in department stores or supermarkets, which apparatus comprises a computer and a storage unit, and is designed as an information and display system. This apparatus allows a user to select desired information stored in the storage unit in a simple and reliable manner. Moreover, direct dialogue between the user and the apparatus is possible. To these ends, a large area contact or sensor bank assembly with an associated signal carrier are provided. Upon approaching or touching an area of the signal carrier, a signal is transmitted to the computer. At least one output unit releases information from the storage unit visually and/or acoustically, which released information is selected through the computer in relation with the above mentioned signal transmitted thereto.

11 Claims, 5 Drawing Sheets

APPARATUS FOR SELECTIVELY RETRIEVING STORED INFORMATION TO A PLURALITY OF OUTPUT UNITS IN RESPONSE TO TOUCHING DISPLAY PANEL AREAS ASSOCIATED WITH THE INFORMATION TO BE RETRIEVED

BACKGROUND OF THE INVENTION

The present invention relates to an apparatus for the storage and release of information regarding an article or the like, this apparatus comprising a computer, a storage unit for storing the information, at least one output unit and an interrogator unit.

European Patent Application No. 00 99 072 describes an apparatus for checking the departure or arrival of goods. By means of a hand-held reader and an identification means, an identification which accompanies or characterized each article can be scanned or interrogated. A keyboard provided in a portable terminal provides additional interrogation capability. Any information of interest may be retrieved by actuating one of the keys of the keyboard. A signal is transmitted through a wireless transmission system from the terminal to a relay station, and the signals received are passed thence, through wiring, to an exchange. The terminal comprises an alphanumeric indicator panel to display the type of product, price and remaining stock. The operation of this apparatus requires adequate knowledge and it is intended for use only by the staff of a department store or the like. A stranger, for example a customer in a department store, would not be able to use it. Moreover, such an apparatus can provide the user with only a small amount of information.

German Offenlegungsschrift No. 30 30 923 describes a device designed to produce a control tape for machine tools. This device contains a digitalizing desk upon which a drawing may be placed and may be scanned with a magnifying glass and a scanning pen. The geometrical data thus digitalized may be displayed on a graphical output unit. Furthermore, corrections, amendments, (etc . . . ) may be carried out with an interactive procedure. A device of this kind is not suitable for transmitting information to a customer in a department store.

British Patent Application No. 20 80 990 discloses an apparatus comprising a display screen and a tactile screen allowing a customer to carry on a direct data dialogue with a computer and a storage unit. The tactile screen, comprising a series of transparent, capacitive-action contact paths or sensors, is arranged in front of the display screen. By means of the sensors, a user may make a selection from a menu offered on the monitor and, by means of a subsequent microprocessor, another menu or the like may be retrieved from the storage unit and may be presented on the display screen. With a tactile screen of this kind, problems with accuracy and resolution arise because of the relatively small dimensions of the picture tube and the display screen. Furthermore, a user may very easily miss the desired position with his finger and thus obtain incorrect information.

In department stores and supermarkets, (etc . . . )there is a considerable need to provide the customer with information regarding products which are offered, the location of such products, their use, and so on. The information carried on the packages of products is often inadequate in practice, especially since, in order to reduce environmental pollution, such packages are ever becoming smaller or are being eliminated altogether. Information and advice provided directly by sales counsellors is costly and requires additional staff. Moreover in exhibitions, museums, airports, etc . . . there is also a considerable need for information regarding objects on display, the location of such objects, and flight connections or the like.

SUMMARY OF THE INVENTION

An object of the present invention is therefore to design an apparatus as an information and display system for products etc . . . , such an apparatus allowing a user to select the desired information in a simple and reliable manner. The apparatus should be designed to provide a customer with a clear and easily visible initial review at least of the products offered or articles on display, or with a layout etc . . . The apparatus should be easy to operate and should provide for direct dialogue between the user and this apparatus.

This object is achieved, in accordance with the present invention, by means of a large area contact or sensor bank assembly. By approaching or touching a signal carrier, for example an image carrier, positioned above the contact or sensor bank assembly, a signal is passed to a computer. Moreover, at least one output unit is provided, by means of which and in dependence upon the said signal, the desired information can be released from the storage unit visually and/or acoustically. Preferably, the bank assembly is arranged stationarily, in the manner of a display surface, and is provided with a unit for allocating the released information to the relevant output unit.

The apparatus according to the invention is characterized by a design both functional and easily adaptable to the relevant operating conditions. The signal carrier may be designed as a kind of poster and may represent diagrams, photographs, drawings, symbols, or the like. Furthermore, the carrier may be designed as a screen for projecting films or slides. It is also within the scope of the present invention to provide an apparatus in which a large area image is produced by electronic means, the said image being represented according to the size of the contact or sensor bank assembly. The carrier, or the image made visible thereon, can be changed or replaced, thereby providing a wide range of possible applications of the apparatus of the invention. The large area contact or sensor bank assembly facilitates operation outstandingly since a user releases the signal to be delivered to the computer merely by touching or approaching the area of interest of the carrier. The bank assembly may be set up in the entrance area of a department store and, in the manner of a display-panel, can offer a layout, a list of products or groups of products, reproductions, or the like.

Depending upon the purpose for which it is to be used, the contact or sensor bank assembly may have overall dimensions of up to a few meters, the lower dimensions being for example of the order of one meter. The conversion of numbers, as is necessary in the case of keyboards, and incorrect operations associated therewith, are eliminated by the apparatus of the present invention. The user merely touches the desired target directly, whereupon he obtains the desired information on an output unit. In contrast with the tactile screens mentioned at the beginning of the present specification, the information appears upon at least one, and preferably two or more output units. Thus, users or customers may operate an optical input unit, with its tactile screen and signal carrier, shortly one after the other and the relevant information will be offered to the relevant customer upon one of the output units, mutual encroachment being thereby practically eliminated. Each customer may make use of the offered information for as long as he wishes. The data processing unit provided in the apparatus may be in the form of a well known computer with a floppy-disc drive or the like, the control and allocation of signals, and of the stored information being carried out by an appropriate software programme. It is desirable to use a microprocessor which may, if necessary, be programmed in accordance with the conditions of use. When a plurality of output units are provided, an allocation is then carried out through an appropriate unit, for example by lighting up a number or a coloured lamp when the signal carrier is touched. A corresponding signal then appears on or at the output unit on which the selected information is being offered.

In one particular configuration of the apparatus according to the present invention, the computer comprises a freely programmable coding unit for storing address signals related to the information in the storage unit, on the one hand, and the coordinates of individual areas of the contact or sensor bank assembly, on the other hand. The coding unit performs, in a surprisingly simple manner, allocation of the areas to be selected by the user to the information. These areas may also be changed. This makes the apparatus highly flexible, changes in the carrier or information being easily effected. The coding unit is preferably in the form of a freely programmable storage unit. A freely programmable storage unit or converter of this kind ensures direct and, moreover, rapid allocation. Specific information concerning products and data regarding location, position, or the like can be stored in the storage unit. Such a storage unit may be in the form of a video-disc, video-recorder, slide-projector, magnetic disc, or the like, for pictorial information. Each piece of information, i.e. the individual image or the individual images of a sequence, has a specific address signal which is called up through the bank assembly. This ensures faster access to the desired information.

According to another configuration of the apparatus of the invention, the signal carrier shows a summary of products or the like and, after the contact or sensor bank assembly has been actuated, the location of the selected product, or the like, in the building, more particularly a department store, is displayed. Thus, the output unit may display a layout of the store, the location of the customer being indicated by a spot of light, while that of the selected group of products, and the way to get there, are indicated by lights, possibly flashing lights.

In one particularly significant configuration of the apparatus according to the present invention, the design of the storage unit is such that the information corresponds to images. The storage unit may then be in the form of a video-disc unit, and also in the form of a video-recorder, a film-projector, or the like. The information can be stored, at very high density, on a video-disc and can be retrieved, with an extremely short access time, in the form of stationary images, spot-advertisements, or the like. Associated with the information are corresponding addresses which can be called up directly by actuating the contact or sensor bank assembly, with very little assistance from the computer, thus eliminating costly software or corresponding conversion units. Commercial video-disc units and output units in the form of monitors with display screens may be used, and no special adaptation or conversion is required.

According to a further configuration of the apparatus of the invention, the contact or sensor bank assembly comprises a series of mechanical, more particularly capacitative, contacts or sensors, preferably arranged side-by-side or one above the other in the manner of a matrix or coordinate field. A bank assembly of this kind may be produced at comparatively low cost, use being made of commercial contacts or sensors. As regards maximal size there are no limits to be observed, so that even very large contact or sensor bank assemblies, with overall dimensions of a few meters, can be produced inexpensively. A defective contact or sensor can simply be replaced; if a defect occurs in the above-mentioned tactile screens, the whole screen must be replaced. The contacts or sensors used in the apparatus according to the invention have touching areas of the order of at least one square centimeter, thus reducing the danger of input errors.

In another particularly significant configuration of the apparatus of the invention, the output unit is mobile and is arranged upon for example a shopping cart, and a preferably wireless transmission system allows communication between such an output unit and the storage unit and/or the computer. By means of the contact or sensor bank assembly, the user first selects the desired information and this information is offered to him on the mobile output unit mounted on a shopping cart. In this case, the storage unit may be a central storage unit, the information being passed from this central storage unit to the shopping cart and output unit by means of the wireless transmission system. To this end appropriate transmitters-receivers are provided and may be either stationary or mobile. Furthermore, a mobile storage unit may be associated with the mobile output unit. Thus, over-riding information can first be selected with the contact or sensor bank assembly, for example in order to find a specific group of products in the store; this can be called up from the central storage unit and can be passed to the mobile output unit by the transmission system. It is also important in this connection to perform an allocation of output units by additional optical and/or acoustic information, so that the user can take the "correct" output unit. The user can then retrieve further information, by direct data dialogue, from the subordinated decentralized storage unit which is mobile and mounted on the shopping cart.

Accordingly, the present invention more particularly proposes an apparatus for storing and releasing information regarding at least one article or the like, comprising:

a large area contact or sensor bank assembly including an associated signal carrier;

a computer;

a storage unit for storing said information; and at least one output unit;

wherein (a) said contact or sensor bank assembly comprises means for supplying a signal to said computer when an area of said signal carrier is approached or touched, (b) said computer comprises means for supplying an address signal to said storage unit in response to the signal from the contact or sensor bank assembly, (c) said storage unit comprises means for transmitting to said at least one output unit information regarding said at least one article or the like and corresponding to said address signal in response to the latter; and (d) said at least one output unit comprises means for releasing visually and/or acoustically the information received from the storage unit.

The objects, advantages and other features of the present invention will become more apparent upon reading of the following non restrictive description of preferred embodiments thereof, taken in conjunction with the accompanying drawings, in which:

DETAILED DESCRIPTION OF PREFERRED EMBODIMENTS

Figure 1:
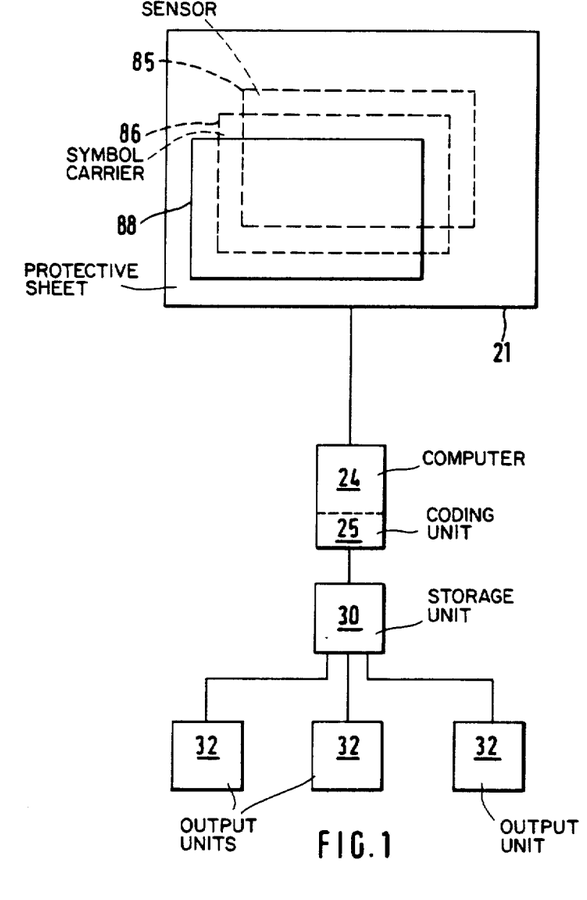
FIG. 1 is a diagrammatical representation of the apparatus of the subject invention, showing a large area contact or sensor bank assembly and a plurality of output units.

FIG. 1 illustrates the apparatus according to the invention provided with a large area contact or sensor bank assembly 21 which is preferably positioned in the entrance area of a department store or the like, where it is easily accessible to its users. In principle, this bank assembly 21 consists of a series of contacts or sensors 85 illustrated only diagramatically on FIG. 1 by a rectangle. Located in front of the contacts or sensors 85 is a signal carrier 86, for example an image carrier, on which is represented for example a layout of the department store, an initial rough selection of products, or the like. The carrier 86 can be easily replaced and it is therefore a very simple matter to adapt the bank assembly 21 to desired requirements. Basically, the signal carrier 86 comprises a poster on which the necessary objects, writing, diagrams, drawings, symbols, lists and the like are shown. However, it is also possible to use a slide projector, a film projector, or the like to project the desired image onto the carrier 86. It is also within the scope of the present invention to use partly transparent projection walls which are illuminated from the rear, the image being visible to an observer from the front. In the latter embodiment, the contacts or sensors 85 must obviously be arranged in front of the carrier 86.

A sheet of glass or flexible foil 88 is arranged in front of the carrier 86 in order to protect this carrier. A user needs merely to touch or tap the area of the carrier 86 in which he is interested, from the front, with his finger, with a suitable interrogator unit (for example a light pen), or the like, in order to transmit the associated input signal to a computer 24 through the contact or sensor bank assembly 21. The computer 24 comprises a coding unit 25 by means of which the coordinates of individual areas of the carrier 86 are associated with address signals for stored information. For this purpose, the coding unit 25 may comprise means for storing address signals for the information stored in the storage unit and means for storing coordinates of individual areas of the assembly 21. This coding unit 25 is preferably in the form of a freely programmable storage unit, so that changes, either to the stored information or to the carrier 86, can be easily made. It is thus very simple to select the desired information, which desired information is then retrieved from a storage unit 30. It is particularly desirable that the storage unit 30 comprises a video-disc unit since, especially in the case of high storage density, the information can be retrieved directly and very rapidly, in the form of a still picture or a spot advertisement. Furthermore, it is within the scope of the invention to use disc-drives for written texts, and cassette recorders or the like for acoustic recordings. The storage unit 30 therefore constitutes a data bank system adapted to existing requirements, in which the necessary information, including addresses and address signals associated therewith, are stored and can be retrieved through the computer 24 by actuating the contact or sensor bank assembly 21.

A plurality of output units 32 (three output units 32 being shown in FIG. 1 for the purpose of exemplification) are provided to release the retrieved information visually and/or acoustically. The advantage of providing several output units 32 is that a plurality of users can request information with the contact or sensor bank assembly 21 one after the other at short intervals, and this information is then offered on one of the output units 32. Mutual interference and encroachment is thus largely eliminated. The output units 32 may be in the form of display screens, loudspeakers, printers and the like.

Figure 2:
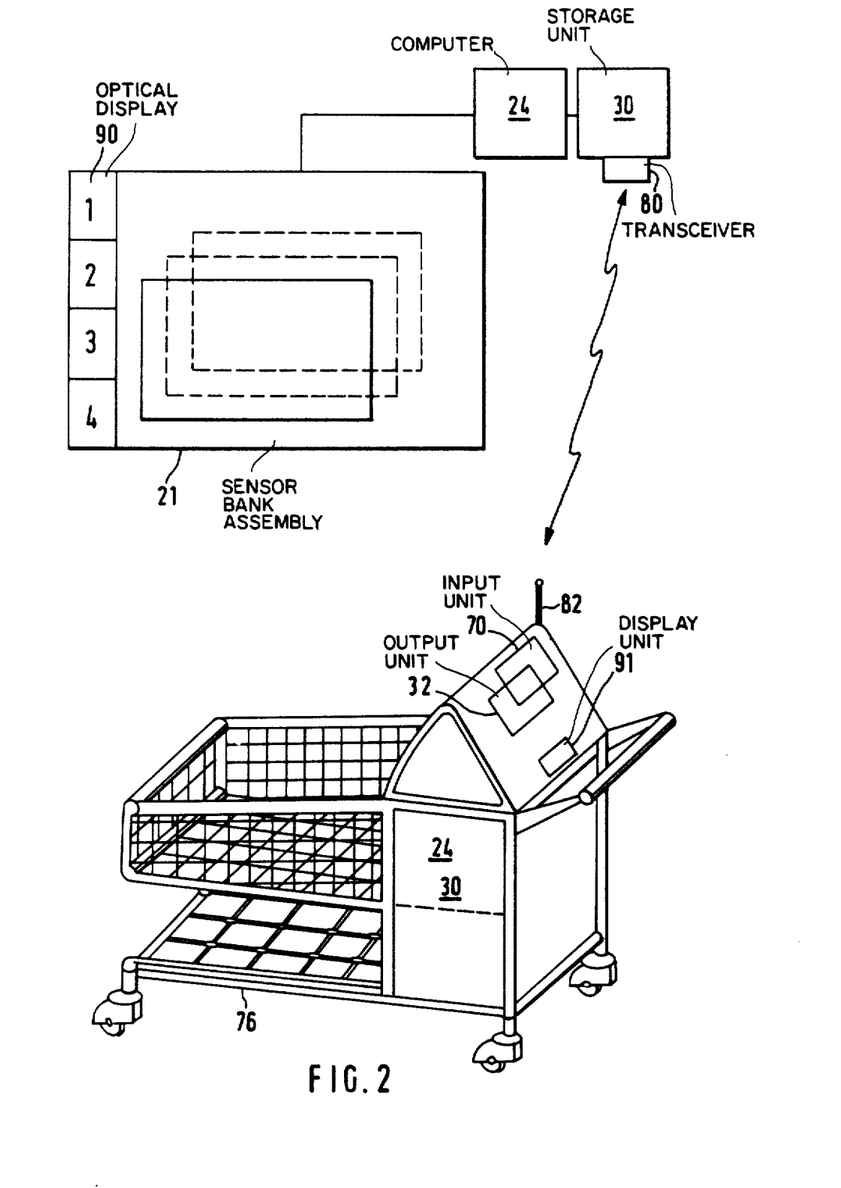
FIG. 2 shows an embodiment of the apparatus according to the present invention comprising a mobile output unit and a wireless transmission system.

FIG. 2 illustrates an embodiment of the apparatus according to the present invention, comprising a mobile output unit 32 mounted on a shopping cart 76. The global apparatus may of course comprise a plurality of such mobile units respectively mounted on a plurality of shopping carts. Located on the contact or sensor bank assembly 21 is a unit in the form of an optical display 90, which in this case bears the digits 1 to 4 by way of example. When the contact or sensor bank assembly 21 is touched, digit 2 for example, lights up on the display 90 and this digit also appears on a display unit 91 on a shopping cart 76. This provides a definite association between a specific selection of information and the relevant output unit 32 on which is displayed this selected information. It would also be possible to give a number to the individual shopping carts, in which case, before selecting information on the contact or sensor bank assembly 21, the user would have to feed in the number of his cart, the display 90 being then replaced by appropriate keys or the like.

A wireless transmission system comprising transmitter-receiver units 80 and 82 shown on FIG. 2 is provided for carrying out transmission of data. This transmission of data can be performed in both directions, namely from unit 80 to unit 82, and from unit 82 to unit 80. In a first possible embodiment, a single, central storage unit 30 is provided, from which central storage unit information called up is transmitted to the respective output units 32 of the shopping carts 76 by means of corresponding wireless transmission systems. In a second possible embodiment of the apparatus according to the present invention, decentralized storage units 30 and associated computers 24 are provided on the shopping carts 76, either in addition or as an alternative to the central unit 30 and the associated computer 24 of the first embodiment. In this second embodiment, the units 80 and 82 are used for communication between the central storage unit 30 or the assembly 21 and the shopping carts 76.

It has been found desirable to divide the information in such a manner that over-riding information, for example regarding the location of products in the store, is accommodated in a central storage unit 30. On the other hand, information which is subordinate in the hierarchy of data is then located directly in the mobile output unit 32 on the relevant shopping cart 76. In such a case, an input unit 70 is associated with each output unit 32, which input unit 70 may be formed by a tactile screen known per se and arranged in front of the display screen on the output unit 32.

Figure 3:
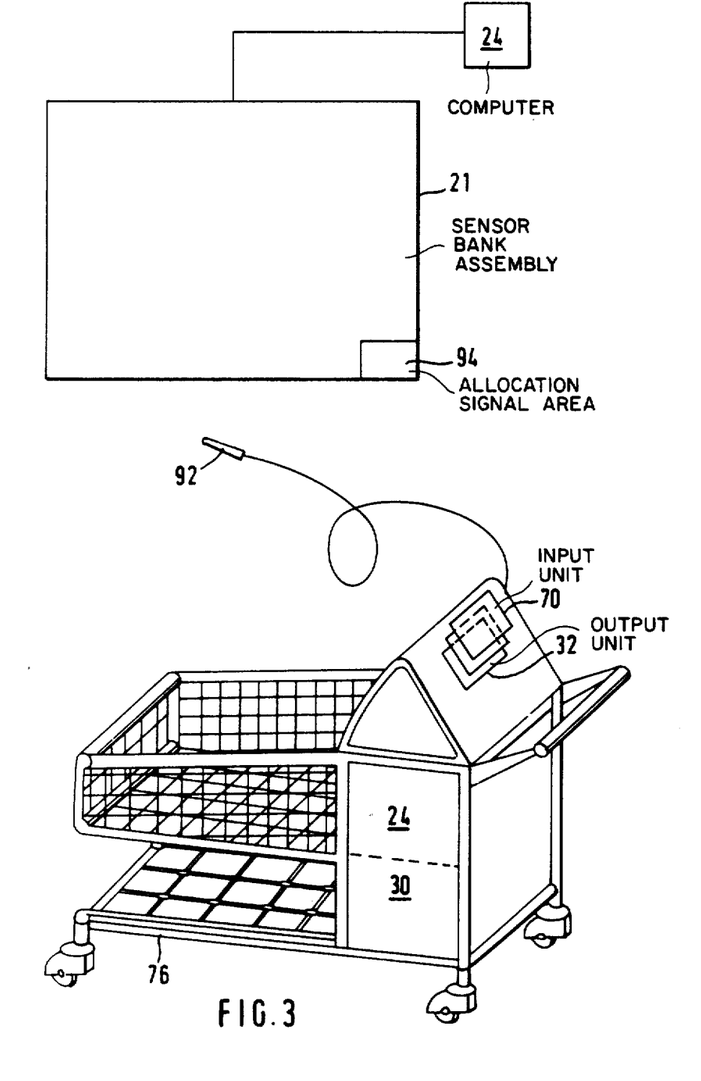
FIGS. 3 and 4 show embodiments of the apparatus of the subject invention in which a light pen or the like is associated with the mobile output unit.

FIG. 3 illustrates another embodiment of the apparatus according to the present invention in which an interrogator unit 92, preferably in the form of a light pen, is associated with the mobile output unit 32 arranged upon the shopping cart 76. The contact or sensor bank assembly 21 is touched with the light pen 92 in the same manner as described hereinbefore and, instead of the above-mentioned displays, there is a direct association between the bank assembly 21 and the output unit 32. In the manner described hereinabove, the user first selects the desired information through the bank assembly 21 and a corresponding allocation signal is delivered through a unit designed here as an area 94. A bar code, for example, then appears in the area 94 and this bar code is interrogated with the interrogator unit 92. The mobile storage unit 30 then delivers to the output unit 32 information corresponding to the allocation signal. Thereafter, a data dialogue can also be carried out by the user directly between the output unit 32, and the tactile screen 70 positioned in front of the latter. However, the information may be entirely retrieved through the use of the bar code only. In this case, a central storage unit is also associated with the stationary bank assembly 21. Data transmission to the output unit 32 may then be effected inductively by means of the interrogator unit 92 inserted into the area 94.

Figure 4:
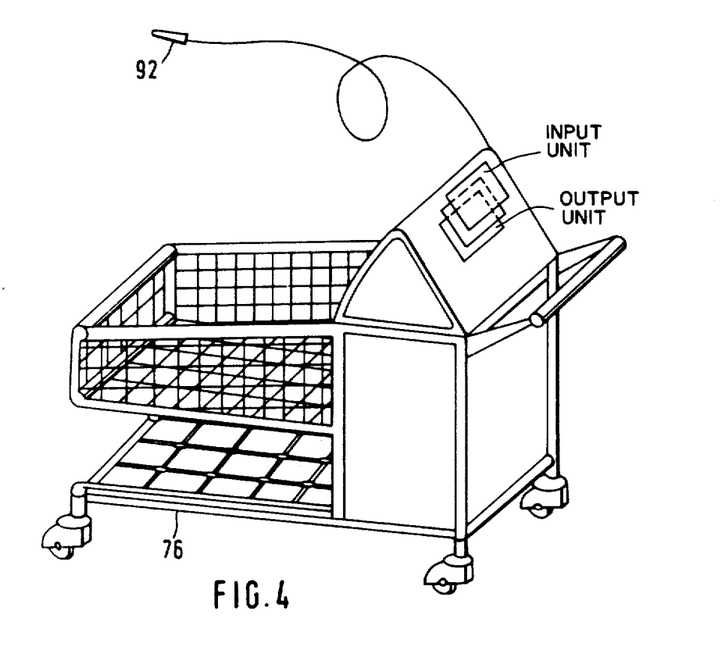

The contact or sensor bank assembly 21 will now be explained in more details with reference to FIG. 4. This assembly 21 includes a series of sensors (for example for detecting the light emitted form the light pen 92) or contacts 85 (which contacts may be mechanical or capacitive) arranged closely side by side and one above the other in a matrix or in coordinate form. The number, and also the size, of the individual contacts or sensors 85 are selected taking into consideration the relevant operating conditions. It is important that the whole area of the assembly 21 be occupied by the contacts or sensors 85, in order to achieve an apparatus having a great flexibility. The contacts or sensors 85 are connected directly to the computer 24 so that this computer can effect a conversion into a corresponding address signal for the storage unit upon actuation of a contact or sensor by touching the signal carrier 86 positioned in front of it. Since the whole area of the bank assembly 21 is occupied by the contacts or sensors 85, a great flexibility is provided so that any desired image carriers 86 can be associated therewith.

The contact or sensor bank assembly 21 may be incorporated into a wall where products are offered. This wall may be in the form of a rack known per se or a product display wall with suitable mountings for positioning these products. Direct interrogation may then be carried out in the manner described hereinabove by touching the sensors or contacts through the image carrier. It is also important, in this connection, for the complete apparatus to be able to cover a plurality of such integrated display walls, a central computer and storage unit being provided for this purpose.

Figure 5:
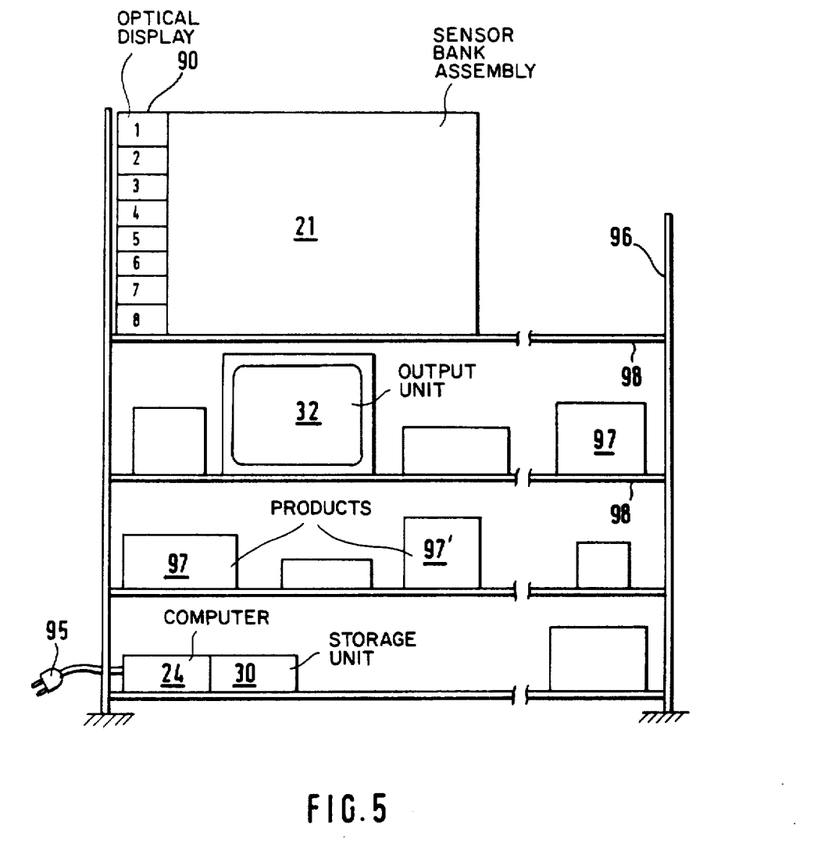
FIG. 5 illustrates diagrammatically an arrangement of a contact or sensor bank assembly in a wall for displaying products.

FIG. 5 is a diagrammatical representation of a display wall 96 in which the contact or sensor bank assembly 21 is incorporated. Such a wall 96 also contains a computer 24 and a storage unit 30. These computer 24 and storage unit 30 are preferably arranged in the rear part of the wall 96 in order to leave space for products 97 in front. As already indicated, as an addition or an alternative, the computer 24 and storage unit 30 may be mobile and may be arranged on a shopping cart. The display wall 96 may be transportable and may be set up, as required, in any location in a store, museum, etc . . . , with no need for costly wiring or the like. The wall is merely plugged into electrical mains. A battery power supply may also be provided if necessary. This proposed apparatus constitutes an automatic system which can be set up without difficulty as required and may be used by a customer having no special knowledge, merely by actuating the large area bank assembly 21. The apparatus according to the invention is outstandingly suitable for inciting customers to undertake an active exchange of information. A user or customer has no inhibitions to overcome, but large amounts of information are easily accessible and are offered. In the simplest case, the display wall 96 may be in the form of a rack in which the products 97, shown only diagrammatically on FIG. 5, are arranged on appropriate mountings 98. Such a display wall may be several meters wide.

The embodiments of the invention which an exclusive property or privilege is claimed are defined as follows:

What is claimed is:

1. An apparatus for selectively retrieving stored information comprising:

a plurality of separate output units for outputting information retrieved from storage;

a single, common inquiry unit serving all of said plurality of output units and comprising a symbol carrier panel comprising a plurality of areas each associated with stored information, and a sensor matrix, the sensors of which are each associated with an area of said symbol carrier panel and may be selectively actuated by a user touching the associated areas of said symbol carrier panel to emit a signal indicating the area of the symbol carrier panel which has been touched;

means for supplying an information storage address signal corresponding to a storage location for information associated with a touched area of said symbol carrier panel in response to a touched area indicating signal received from said sensor matrix;

an information storage unit for storing informating relating to areas of said symbol carrier panel and for retrieving information associated with a touched area of said symbol carrier panel in response to receipt of an address signal corresponding to the storage location for the information to be retrieved; and     means for assigning retrieved information to one of said plurality of separate output units for communication to a user.

2. Apparatus according to claim 1, wherein said inquiry unit is stationary; each of said output units is a mobile output unit, and a wireless transmission system is provided for transmitting information to said mobile output units.

3. Apparatus according to claim 2, wherein each mobile output unit further comprises an interrogator unit for identifying desired information to be retrieved from said storage unit and outputted by that mobile output unit.

4. Apparatus according to claim 3, wherein said interrogator unit comprises a light probe for reading bar codes displayed in response to touching of said symbol carrier panel.

5. Apparatus according to claim 2, wherein each mobile output unit is mounted on a shopping cart.

6. An apparatus according to claim 1, further comprising means on said inquiry unit for displaying indica identifying the output unit to which retrieved information has been assigned for output.

7. Apparatus according to claim 6, further comprising means on each output unit for displaying output unit identifying indica whenever retrieved information is assigned thereto.

8. Apparatus according to claim 1, wherein said symbol carrier panel displays a floor plan of a retail store, museum, or airport.

9. Apparatus according to claim 1, wherein symbols on said symbol carrier panel represent items available for purchase in a retail store, and information relating to the location of desired items is retrieved by a user touching the symbols on said display panel representing the desired items.

10. Apparatus according to claim 1, wherein said storage unit is a video-disc unit.

11. Apparatus according to claim 1, wherein said symbol carrier panel is larger than any of said output units.

* * * * *